United States Patent Office 3,493,604
Patented Feb. 3, 1970

---

3,493,604
3,5-DIHALO-4-(4-ALKOXYPHENOXY) PHENOXY ACETIC ACIDS AND DERIVATIVES
Norman A. Nelson, Galesburg, Mich., assignor to The Upjohn Company, Kalamazoo, Mich., a corporation of Delaware
No Drawing. Filed Mar. 15, 1967, Ser. No. 623,217
Int. Cl. C07c 69/76, 103/22
U.S. Cl. 260—473                    3 Claims

ABSTRACT OF THE DISCLOSURE

Halo-substituted p-(p-alkoxyphenoxy)phenoxyalkanoic acids, and the corresponding alkyl esters and alkanoamids are disclosed. These compounds are useful as hypocholesterolemic agents.

BACKGROUND OF THE INVENTION

It is known that relatively high serum cholesterol and triglyceride levels are injurious to arterial tissue, and that such injuries may be one of the causes of coronary heart disease and atherosclerosis. It has now been found that the serum lipid level in a mammal, and in particular the cholesterol and the triglyceride levels, can be lowered by administering to the mammal an effective amount of a compound of the present invention.

SUMMARY OF THE INVENTION

The compounds of the present invention can be represented by the formula

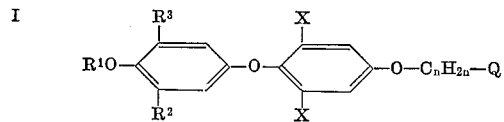

wherein $R^1$ is an alkyl containing from 1 to about 4 carbon atoms, $R^2$ and $R^3$ can be alike or different and can be hydrogen or an alkyl containing from 1 to about 4 carbon atoms, X can be a halo group, and Q can be carboxy, alkoxycarbonyl, carbamoyl, alkylcarbamoyl, or dialkylcarbamoyl with the alkyl portions of the foregoing containing from 1 to about 4 carbon atoms. The subscript $n$ represents an integer having a value from 1 to 4, inclusive.

The compounds of this invention are useful as hypocholesterolemic agents.

DETAILED DESCRIPTION OF THE INVENTION

The starting material for the preparation of the compounds of this invention can be a phenol represented by the formula

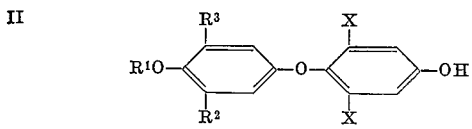

wherein $R^1$, $R^2$, $R^3$, and X have the same meaning as before. Methods for the preparation of phenols within the purview of Formula II can be found in J. Am. Chem. Soc., 61, 2472 (1939).

Phenols of Formula II can also be prepared through the coupling of a bis(alkanesulfonate) of 2,6 - dinitrohydroquinone with a p-alkoxyphenol. The coupling can be carried out by refluxing the reactants in a suitable solvent such as pyridine for a time period in the range from about 1 minute to about 60 minutes.

The bis(alkanesulfonates) of 2,6-dinitrohydroquinone are a known class of compounds and can be prepared in accordance with the teachings of Schwartz, Acta Chim. Acad. Sci. Hung., 20, 415–418 (1959) [C.A., 54, 12033c (1960)]. By the same token, suitable p-alkoxyphenols can be prepared by the Elbs reaction as set forth in J. Chem. Soc., 2303 (1948). Illustrative p-alkoxyphenols are 4-methoxyphenol, 4 - ethoxyphenol, 4 - propoxyphenol, 4-butoxyphenol, 4-isobutoxyphenol, 3-methyl - 4 - methoxyphenol, 3 - methyl - 4 - propoxyphenol, 3,5 - dimethyl - 4-methoxyphenol, 3,5-diethyl-4-methoxyphenol, and the like.

The nitro groups remaining on the coupled product can be reduced to amino groups by catalytic hydrogenation with palladium-on-carbon catalyst or with Raney nickel catalyst in a suitable solvent such as acetic acid, propionic acid, tetrahydrofuran, the lower aliphatic alcohols, and the like, and the amino groups, in turn, can be replaced by halogens via the corresponding bis-diazonium salt and the Sandmeyer reaction.

The resulting halo-substituted p - (p - alkoxyphenoxy) phenyl alkanesulfonate can be saponified by heating it in an aqueous lower aliphatic alcohol solution, e.g., aqueous methanol, with an alkali metal hydroxide, e.g., sodium hydroxide or potassium hydroxide, concentrating the mixture, diluting it with water, and then acidifying it to obtain the corresponding halo-substituted p-(p-alkoxyphenoxy) phenol of Formula II.

Illustrative of the starting phenols represented by Formula II are 3,5-diiodo-4-(3,5-dimethyl - 4 - ethoxyphenoxy)phenol, 3,5 - dibromo - 4 - (3,5 - dimethyl - 4-methoxyphenoxy)phenol, 3,5 - dichloro - 4 - (3,5 - dipropyl - 4 - butoxyphenoxy)phenol, 3,5 - dichloro - 4-(3 - methyl - 5 - ethyl - 4 - butoxyphenoxy)phenol, and the like.

The overall reaction scheme for the preparation of the compounds of this invention is set forth below, with $R^1$, $R^2$, $R^3$, and X having the same meaning as before, $R^4$ representing alkyl containing from 1 to about 4 carbon atoms, and $R^5$ representing hydrogen or alkyl containing from 1 to about 4 carbon atoms.

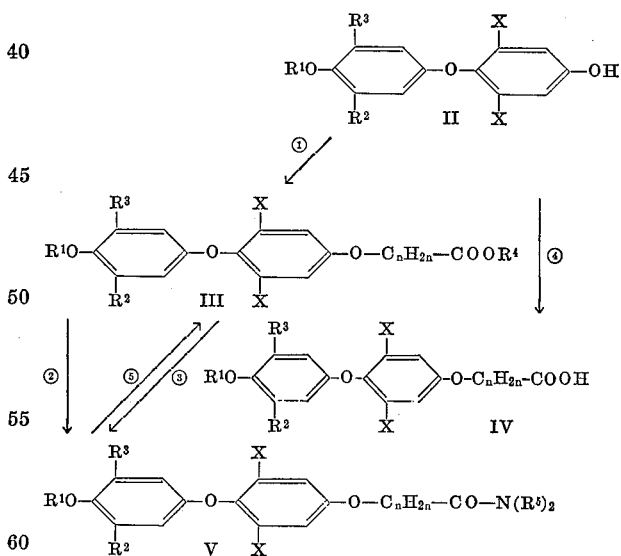

In order to prepare compounds where the Q substituent in the generic Formula I is alkoxycarbonyl, i.e., compounds of the type shown by Formula III, the phenol (II) is converted to its corresponding alkali metal salt in an anhydrous lower alcohol solution, preferably an alcohol corresponding to the alkoxy portion —$OR^4$ of the ester to be prepared, and then coupled with an alkyl haloalkanoate such as methyl bromoacetate, ethyl bromoacetate, propyl bromoacetate, butyl bromoacetate, methyl chloroacetate, ethyl iodoacetate, the methyl, ethyl, propyl and butyl esters of alpha-bromopropionic acid and of beta-bromopropionic acid, methyl gamma-bromobutyrate, ethyl alpha-bromovalerate, and the like. The coupling reaction can be carried out in a temperature range from about 20° C. to about 100° C. and preferably at about 75° C. The reaction time normally ranges from about 30 minutes to about 6 hours (Step 1).

The thus produced alkyl esters (III) can then be subjected to aminolysis with a basic nitrogenous compound to produce the corresponding alkanoamides (V). The basic nitrogenous compound can be ammonia, a primary amine, or a secondary amine. The aminolysis reaction can be carried out by mixing the alkyl ester (III) and the basic nitrogenous compound in the presence of an inert organic diluent such as a lower aliphatic alcohol, e.g., methanol, ethanol, 1-propanol, 2-propanol, 1-butanol, and the like, or an aromatic solvent, e.g., benzene, toluene, xylene, cumene, cymene, and the like. Stoichiometrically, equimolar amounts of the reactants are required, but it is generally preferred to employ an excess of the basic nitrogenous compound. The reaction can be carried out in a closed system, e.g., in a tube or an autoclave, or in an open system. The aminolysis reaction can be carried out at a temperature in the range from about 25° C. to about 200° C., and preferably from about 50° C. to about 120° C. The reaction time can range from about 10 to about 24 hours. After the reaction has been completed, the produced alkanoamide (V) can be isolated and purified by conventional procedures such as evaporation of the mixture of reactants and volatile reaction products, then chromatography, recrystallization, and the like (Step 2).

Illustrative primary amines suitable for use in the aforesaid aminolysis reaction are methylamine, ethylamine, propylamine, isopropylamine, butylamine, sec.-butylamine, and the like Illustrative secondary amines are dimethylamine, diethylamine, dipropylamine, diisobutylamine, dibutylamine, N-methylethylamine, N-methylbutylamine, and the like.

In addition to the alkanoamides (V), the corresponding acids (IV) can be produced from the alkyl esters (III) by saponification. The alkyl esters (III) can be saponified in an aqueous lower aliphatic alcohol solution, e.g., aqueous methanol solution, with an alkali metal hydroxide, e.g., sodium hydroxide or potassium hydroxide, by stirring at a temperature in the range from about 20° C. to about 70° C. for about 1 to about 24 hours. Thereafter the obtained mixture can be concentrated by evaporation so as to remove most of the alcohol, diluted with water, and filtered. Acidification of the recovered filtrate precipitates the acid (IV) which can be further purified, if desired, e.g., by recrystallization (Step 3).

An alternate procedure for the preparation of the acid (IV) involves the reaction of the phenol (II) with a haloalkanoic acid such as chloroacetic acid, bromoacetic acid, iodoacetic acid, alpha-chloropropionic acid, beta-bromopropionic acid, alpha-chlorobutyric acid, alpha-bromobutyric acid, alpha-chlorovaleric acid, alpha-bromovaleric acid, and the like. The reaction can be carried out in a solvent such as water, aqueous methanol solution, aqueous ethanol solution, aqueous tetrahydrofuran solution, or the like, at a pH of at least about 11, and a temperature in the range from about 20° C. to about 100° C. The reflux temperature is preferred. The reaction time can range from about 1 hour to about 10 hours. Acidification of the reaction product to a pH of about 2 or below produces the corresponding acid (IV) which can be further purified in the conventional manner, if desired (Step 4).

The acid (IV) can also be esterified to produce the corresponding alkyl ester (III) by admixing the acid (IV), the desired alcohol, e.g., methanol, ethanol, propanol, or butanol, and a catalytic amount of concentrated sulfuric acid, p-toluenesulfonic acid, or the like, and then stirring the admixture at a temperature in the range from about 20° C. to about 100° C. for a time period of from about 1 hour to about 10 hours. The reaction mixture is then neutralized by a base such as pyridine, and the produced alkyl ester (III) recovered in the conventional manner (Step 5).

The instant invention is further illustrated by the following examples.

EXAMPLE I

Preparation of methyl [3,5-diiodo-4-(3,5-dimethyl-4-methoxyphenoxy)phenoxy]acetate To 3,5-diiodo-4-(3,5-dimethyl - 4 - methoxyphenoxy) phenol (about 6 grams, 12.1 millimoles) in anhydrous methanol (about 75 milliliters) was added, with stirring, methanolic sodium methoxide (about 2.82 milliliters of a 4.56 N solution), and then methyl bromoacetate (about 2.5 milliliters). After the addition was complete, the resulting mixture was refluxed for about 4 hours.

After the mixture had been refluxed for about one hour, a precipitate was observed to form. The precipitate was identified as methyl [3,5-diiodo-4-(3,5-dimethyl-4-methoxyphenoxy)phenoxyl]-acetate.

In a similar manner, but starting with 3,5-dichloro-4-(3,5-diethyl-4-methoxyphenoxy)phenol the methyl [3,5-dichloro-4-(3,5-diethyl - 4 - methoxyphenoxy)phenoxy] acetate can be prepared;

Starting with 3,5-diiodo-4-(4-methoxyphenoxy)phenol the methyl [3,5-diiodo-4-(4-methoxyphenoxy)phenoxy] acetate can be prepared;

Starting with 3,5-dichloro - 4 - (3,5-dipropyl-4-butoxyphenoxy)phenol the methyl [3,5-dichloro-4-(3,5-dipropyl-4-butoxyphenoxy)phenoxy]acetate can be prepared;

Starting with 3,5-bromo - 4 - (3,5-dimethyl-4-methoxyphenoxy)phenol the methyl [3,5-bromo-4-(3,5-dimethyl-4-methoxyphenoxy)phenoxy]acetate can be prepared, etc.

Similarly, reacting ethyl bromoacetate in ethanol with 3,5-diiodo-4-(3,5-dimethyl-4-methoxyphenoxy)phenol the ethyl [3,5-diiodo-4-(3,5-dimethyl - 4 - methoxyphenoxy)-phenoxy]acetate can be prepared;

Reacting propyl bromoacetate in propanol with 3,5-diiodo-4-(3,5-dimethyl-4-methoxyphenoxy)phenol the propyl [3,5-diiodo-4-(3,5-dimethyl-4-methoxyphenoxy)phenoxy]acetate can be prepared;

Reacting butyl bromoacetate in butanol with 3,5-diiodo-4-(3,5-dimethyl-4-methoxyphenoxy)phenol the butyl [3,5-diiodo-4-(3,5-dimethyl-4 - methoxyphenoxy)phenoxy]acetate can be prepared, etc.

EXAMPLE II

Preparation of N,N-dimethyl-[3,5-diiodo-4-(3,5-dimethyl-4-methoxyphenoxy)phenoxy]acetamide The crude precipitate prepared as set forth in Example I, above, was rinsed into a 600-milliliter Carius tube using methanol (about 100 milliliters), and anhydrous dimethylamine (about 125 milliliters) was added at a temperature of about 0° C. Thereafter the tube was sealed and the therein contained mixture heated in a steam bath for about 15 hours and with occasional agitation.

Thereafter the mixture was cooled, and then concentrated by evaporation in vacuo. The obtained residue was dissolved in methylene chloride, washed with a dilute aqueous hydrochloric acid solution, a dilute aqueous sodium hydroxide solution, water, and then dried. The dried methylene chloride solution was concentrated by evaporation in vacuo, and the produced residue was crystallized from methanol. About 4.6 grams of a crystalline product, melting at 139° to 141° C. was obtained. Further recrystallization raised the melting point to 140.5° to 142° C.

The crystalline product was identified as N,N-dimethyl-[3,5 - diiodo - 4 - (3,5 - dimethyl-4-methoxyphenoxy) phenoxy]acetamide, obtained in about 65.4 percent yield, based on the starting phenol of Example I.

*Analysis.*—Calcd. for $C_{19}H_{21}I_2NO_4$: C, 39.26; H, 3.64; I, 43.67. Found: C, 39.32; H, 3.64; I, 43.08.

In a manner similar to Examples I and II but using ammonia or an amine such as methylamine, ethylamine, propylamine, butylamine, diethylamine, dibutylamine, or the like, in lieu of dimethylamine employed above,

[3,5-diiodo-4-(3,5-dimethyl-4-methoxyphenoxy)-phenoxy]acetamide,
N-methyl-[3,5-diiodo-4-(3,5-dimethyl-4-methoxyphenoxy)phenoxy]acetamide,
N-ethyl-[3,5-diiodo-4-(3,5-dimethyl-4-methoxyphenoxy)phenoxy]acetamide,
N-propyl-[3,5-diiodo-4-(3,5-dimethyl-4-methoxyphenoxy)phenoxy]acetamide,
N-butyl-[3,5-diiodo-4-(3,5-dimethyl-4-methoxyphenoxy)phenoxy]acetamide,
N,N-diethyl-[3,5-diiodo-4-(3,5-dimethyl-4-methoxyphenoxy)phenoxy]acetamide, and
N,N-dibutyl-[3,5-diiodo-4-(3,5-dimethyl-4-methoxyphenoxy)phenoxy]acetamide, respectively, can be prepared.

Similarly, reacting dimethylamine and methyl [3,5-dibromo - 4 - (3,5-dimethyl-4-methoxyphenoxy)phenoxy]acetate the N,N-dimethyl-[3,5-dibromo-4-(3,5-dimethyl-4-methoxyphenoxy)phenoxy]acetamide can be prepared:

Reacting N-methylethylamine and methyl [3,5-diiodo-4-(4 - methoxyphenoxy)phenoxy]acetate the N-ethyl-N-methyl - [3,5 - diiodo - 4-(4-methoxyphenoxy)phenoxy]-acetamide can be prepared:

Reacting diethylamine and methyl 3 - [3,5-dichloro-4-(3,5 - dimethyl - 4-methoxyphenoxy)phenoxy]propionate the N,N-diethyl - 3[3,5-dichloro-4-(3,5-dimethyl-4-methoxyphenoxy)phenoxy]propionamide can be prepared;

Reacting butylamine and ethyl 4-[3,5-dibromo-4-(3,5-dimethyl-4-ethoxyphenoxy)phenoxy]butyrate the N-butyl-4 - [3,5-dibromo-4-(3,5-dimethyl-4-ethoxyphenoxy)phenoxy]butyramide can be prepared;

Reacting ammonia and propyl [3,5-diiodo-4-(3,5-diethyl - 4 - butoxyphenoxy)phenoxy]acetate the [3,5-diiodo - 4 - (3,5-diethyl-4-butoxyphenoxy)phenoxy]acetamide can be prepared, etc.

EXAMPLE III

Preparation of halo-substituted p-(p-alkoxyphenoxy)phenoxy alkanoic acids

To a solution of 3,5 - dichloro - 4 - (3-methyl-5-ethyl-4-butoxyphenoxy)phenol (about 0.05 mole) in aqueous methanol (about 250 milliliters) is added chloroacetic acid (in excess of about 0.05 mole) and sufficient sodium hydroxide to maintain the resulting admixture at a pH of about 11 or higher.

The mixture is then stirred for about 10 hours at about 30° C., then cooled and acidified with hydrochloric acid to a pH of about 3. Thereafter the formed solid product, which is [3,5-dichloro-4-(3-methyl-5-ethyl-4-butoxyphenoxy)phenoxy]acetic acid, is recovered by filtration, washed with water, and purified by recrystallization from acetone.

In a like manner, but starting with 3,5-diiodo-4-(3,5-dimethyl-4-methoxyphenoxy)phenol the product which is [3,5 - diiodo - 4-(3,5-dimethyl-4-methoxyphenoxy)phenoxy]acetic acid can be prepared;

Starting with 3,5 - dichloro-4-(3,5-diethyl-4-methoxyphenoxy)phenol the product which is [3,5 - dichloro-4-(3,5 - diethyl-4-methoxyphenoxy)phenoxy]acetic acid can be prepared;

Starting with 3,5 - dibromo - 4-(3,5-diethyl-4-ethoxyphenoxy)phenol the product which is [3,5-dibromo-4-(3,5-diethyl-4-ethoxyphenoxy)phenoxy]acetic acid can be prepared;

Starting with 3,5-dibromo-4-(3,5-dimethyl-4-methoxyphenoxy)phenol the product which is [3,5-dibromo-4-(3,5-dimethyl-4-methoxyphenoxy)phenoxy]acetic acid can be prepared, etc.

Similarly, by reacting alpha-bromopropionic acid with 3,5 - dibromo-4-(3,5-diethyl-4-ethoxyphenoxy)phenol the product which is 2-[3,5-dibromo-4-(3,5-diethyl-4-ethoxyphenoxy)phenoxy]propionic acid can be prepared;

By reacting alpha-bromovaleric acid with 3,5-diiodo-4-(4-methoxyphenoxy)phenol the product which is 2-[3,5-diiodo-4-(4-methoxyphenoxy)phenoxy]valeric acid can be prepared;

By reacting alpha-chlorobutyric acid with 3,5-diiodo-4-(3,5 - dimethyl - 4-methoxyphenoxy)phenol the product which is 2 - [3,5-diiodo-4-(3,5-dimethyl-4-methoxyphenoxy)phenoxy]butyric acid can be prepared, etc.

EXAMPLE IV

Preparation of 2-methyl-2-[3,5-diiodo-4-(3,5-dimethyl-4-methoxyphenoxy)phenoxy]propionic acid To a solution of 3,5-diiodo-4-(3,5-dimethyl-4-methoxyphenoxy)phenol (about 0.035 mole) in acetone (about 150 milliliters) and containing powdered sodium hydroxide (about 8.6 grams) is added, with stirring, chloroform (about 4.7 milliliters).

The resulting admixture is then refluxed for about 6 hours, concentrated by evaporation in vacuo, and the obtained residue dissolved in water. The aqueous solution is then acidified to produce 2-methyl-2-[3,5-diiodo-4-(3,5-dimethyl-4-methoxyphenoxy)phenoxy]propionic acid in the form of a precipitate.

The precipitate can be further treated with a dilute aqueous sodium bicarbonate solution and thereafter filtered. Acidification of the filtrate reprecipitates the above 2 - methyl - 2 - [3,5-diiodo-4-(3,5-dimethyl-4-methoxyphenoxy)phenoxy]propionic acid which can be recovered by further filtration. The precipitate can then be washed and purified by recrystallization in conventional manner.

EXAMPLE V

Saponification of esters

Methyl [3,5 - diiodo - 4-(3,5-dimethyl-4-methoxyphenoxy)phenoxy]acetate (about 0.1 mole) is dissolved in a 25 percent aqueous methanol solution (about 400 milliliters) and admixed with sodium hydroxide (about 0.25 mole). The obtained admixture is then stirred at about 50° C. for about 15 hours.

Thereafter the admixture is concentrated by evaporation in vacuo, diluted with water, and filtered. Acidification of the filtrate produces a precipitate which is [3,5-diiodo - 4 - (3,5 - dimethyl-4-methoxyphenoxy)phenoxy]-acetic acid. This precipitate can be further purified, if desired, in a conventional manner.

EXAMPLE VI

Esterification of acids

2 - [3,5 - dichloro-4-(3-methyl-5-ethyl-4-propoxyphenoxy)phenoxy]acetic acid (about 0.1 mole), butanol (about 400 milliliters), and concentrated sulfuric acid (about 5 milliliters) are combined and stirred at a temperature of about 60° C. for about 5 hours. Then a slight excess of pyridine is added thereto to neutralize the sulfuric acid, and the obtained admixture is concentrated rapidly by evaporation in vacuo.

The residue obtained after concentration is shaken with diethyl ether and a dilute aqueous sodium hydroxide solution. The organic layer produced is separated, washed with water, dried, and concentrated by evaporation in vacuo. The obtained residue is butyl [3,5-dichloro-4-(3-methyl-5-ethyl - 4-propoxyphenoxy)phenoxy]acetate which can be purified in conventional manner.

I claim:

1. A compound represented by the formula

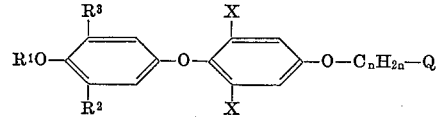

wherein $R^1$ is an alkyl containing from 1 to about 4 carbon atoms, $R^2$ and $R^3$ are members of the grouping consisting of hydrogen and an alkyl containing from 1 to about 4 carbon atoms, X is halo, Q is a member of the grouping consisting of carboxy, alkoxycarbonyl, carbamoyl, and dialkylcarbamoyl, the alkyl portions of each member containing from 1 to about 4 carbon atoms, and wherein $n$ is an integer having a value from 1 to 4, inclusive.

2. A compound in accordance with claim 1 wherein $R^1$, $R^2$, and $R^3$ are methyl, X is iodo, Q is methoxycarbonyl, and $n$ has a value of 1.

3. A compound in accordance with claim 1 wherein $R^1$, $R^2$, and $R^3$ are methyl, X is iodo, Q is dimethylcarbamoyl, and $n$ has a value of 1.

References Cited

UNITED STATES PATENTS

| | | | |
|---|---|---|---|
| 3,038,934 | 6/1962 | Kerwin | 260—520 X |
| 3,109,024 | 10/1963 | Meltza et al. | 260—519 |
| 3,361,789 | 1/1968 | Blank | 260—520 X |

OTHER REFERENCES

Herrmann et al.: Chem. Abstr., 56, 5323g (1962).
Merck Index, p. 1052 8th ed., 1968.

LORRAINE A. WEINBERGER, Primary Examiner

D. STANZEL, Assistant Examiner

U.S. Cl. X.R.

260—520, 559

UNITED STATES PATENT OFFICE
CERTIFICATE OF CORRECTION

Patent No. 3,493,604        Dated September 10, 1970

Inventor(s) Norman A. Nelson

It is certified that error appears in the above-identified patent and that said Letters Patent are hereby corrected as shown below:

Column 1, line 72, for "Sc*h*wartz" read --- Sch*a*wartz ---.

Column 2, line 51-55, for " [arrows with ⑤ and ③] ", linking formula III to V read --- [arrows with ⑤ and ③] ---, linking formula III to IV.

SIGNED AND SEALED
NOV 3 1970

(SEAL)
Attest:

Edward M. Fletcher, Jr.
Attesting Officer

WILLIAM E. SCHUYLER, JR.
Commissioner of Patents